(12) United States Patent
Dusik

(10) Patent No.: US 11,975,729 B2
(45) Date of Patent: May 7, 2024

(54) METHOD FOR GENERATING A VOICE ANNOUNCEMENT AS FEEDBACK TO A HANDWRITTEN USER INPUT, CORRESPONDING CONTROL DEVICE, AND MOTOR VEHICLE

(71) Applicant: AUDI AG, Ingolstadt (DE)

(72) Inventor: Jan Dusik, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 619 days.

(21) Appl. No.: 17/263,446

(22) PCT Filed: Jul. 29, 2019

(86) PCT No.: PCT/EP2019/070336
§ 371 (c)(1),
(2) Date: Jan. 26, 2021

(87) PCT Pub. No.: WO2020/035297
PCT Pub. Date: Feb. 20, 2020

(65) Prior Publication Data
US 2021/0284187 A1    Sep. 16, 2021

(30) Foreign Application Priority Data
Aug. 13, 2018 (DE) .................. 10 2018 213 602.5

(51) Int. Cl.
*B60W 50/00* (2006.01)
*B60W 50/10* (2012.01)
(Continued)

(52) U.S. Cl.
CPC ......... *B60W 50/10* (2013.01); *G01C 21/3608* (2013.01); *G01C 21/3611* (2013.01);
(Continued)

(58) Field of Classification Search
CPC ............... B60W 50/10; G01C 21/3608; G01C 21/3611; G06F 3/167; G10L 15/22
(Continued)

(56) References Cited

U.S. PATENT DOCUMENTS 6,076,060 A    6/2000 Lin et al.
6,446,041 B1   9/2002 Reynar et al.
(Continued)

FOREIGN PATENT DOCUMENTS

DE          60012655 T2    7/2005
DE     102005021526 A1    11/2006
(Continued)

OTHER PUBLICATIONS

International Preliminary Report on Patentability directed to related International Patent Application No. PCT/EP2019/070336, dated Feb. 16, 2021, with attached English-language translation; 12 pages.
(Continued)

*Primary Examiner* — Susan I McFadden
(74) *Attorney, Agent, or Firm* — Sterne, Kessler, Goldstein & Fox P.L.L.C.

(57) ABSTRACT

A method for generating a voice announcement as feedback to a handwritten user input is disclosed in which a user enters on a control device. A list of possible whole words which can be entered by the user input is provided together with a corresponding transcription and a predetermined word end, which comprises one or more characters of a whole word of the whole words, is removed from the end of said whole word in accordance with a predetermined shortening rule and corresponding to this, a transcription end corresponding to the word end is determined based on a predetermined assignment rule and is removed from the corresponding transcription of the whole word for generating a partial word and an associated partial transcription.

(Continued)

The partial word and the partial transcription are added to another list.

18 Claims, 1 Drawing Sheet

(51) Int. Cl.
    *G01C 21/00*     (2006.01)
    *G01C 21/36*     (2006.01)
    *G06F 3/16*     (2006.01)
    *G10L 15/22*     (2006.01)

(52) U.S. Cl.
    CPC ......... *G01C 21/3896* (2020.08); *G06F 3/167* (2013.01); *G10L 15/22* (2013.01)

(58) Field of Classification Search
    USPC ........................................................ 704/260
    See application file for complete search history.

(56) References Cited

U.S. PATENT DOCUMENTS

| | | | |
|---|---|---|---|
| 7,444,286 B2* | 10/2008 | Roth | ................ G10L 15/22 |
| | | | 704/270 |
| 10,388,272 B1* | 8/2019 | Thomson | ................ G10L 15/22 |
| 10,573,312 B1* | 2/2020 | Thomson | ................ G10L 15/22 |
| 10,854,201 B2* | 12/2020 | Dusik | ................ B60R 11/0247 |
| 2006/0210173 A1 | 9/2006 | Jurion et al. | |
| 2009/0125224 A1 | 5/2009 | Basche et al. | |
| 2013/0080173 A1 | 3/2013 | Talwar et al. | |

FOREIGN PATENT DOCUMENTS

| | | |
|---|---|---|
| DE | 102005031656 A1 | 1/2007 |
| DE | 102007028235 A1 | 12/2008 |
| DE | 102012006714 A1 | 8/2012 |
| DE | 102012217160 A1 | 3/2013 |

OTHER PUBLICATIONS

International Search Report and Written Opinion of the International Searching Authority directed to related International Patent Application No. PCT/EP2019/070336, dated Nov. 8, 2019, with attached English-language translation; 14 pages.

* cited by examiner

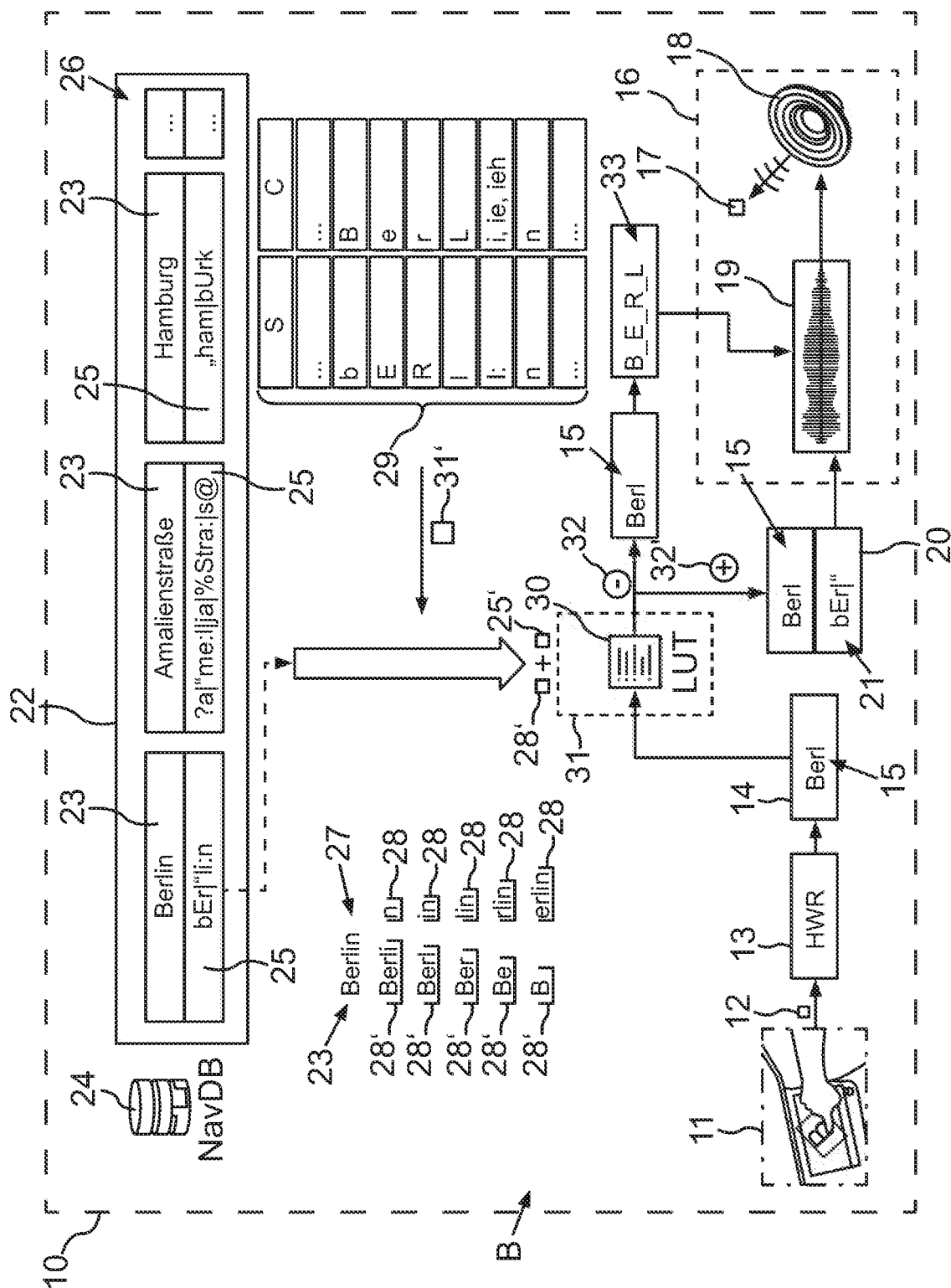

METHOD FOR GENERATING A VOICE ANNOUNCEMENT AS FEEDBACK TO A HANDWRITTEN USER INPUT, CORRESPONDING CONTROL DEVICE, AND MOTOR VEHICLE

TECHNICAL FIELD

The present disclosure relates to a method for generating a voice message as feedback to a handwritten user input that a user enters on a control device. The present disclosure also includes said control device and a motor vehicle comprising such a control device.

BACKGROUND

In a motor vehicle or another device, for example a smartphone or a tablet PC, an input apparatus can be provided, by means of which a user can enter a handwritten user input. Such a handwritten user input may be handwritten text or a handwritten word, for example. So that the user can check or recognize whether their handwritten user input was correctly recognized by the control device, it may be provided that a handwritten input word can first be recognized in the known manner by means of handwriting recognition software, as a result of which the word is present as alphabetic-character text, and then the recognized word is output as a voice message using speech synthesis (TTS—text to speech). The user then receives verbal or acoustic feedback and can use it to check whether their handwritten user input was correctly recognized.

If, for example, a user in a motor vehicle would like to enter the word "Berlin" as the destination address in a navigation assistance system, they can do this, among other things, via a touchscreen. To this end, they can carry out the handwritten user input by writing on the touchscreen with a finger or an input object (for example a stylus). This handwritten user input can then be output acoustically as a voice message by means of a voice synthesis apparatus and can thus be confirmed. This can be done either by spelling the user input (in the example, "B E R L I N") or by reading it out as a whole word.

A voice message by means of spelling is cognitively potentially less favorable for a user because they can lose their bearings with a longer word. There is therefore in particular the need to distract a driver as little as possible while they are driving a motor vehicle, by the confirmation or voice message for the handwritten user input being made in a natural form, i.e., as a whole word that is read out (in the example, "Berlin").

However, the problem arises here that a user can interrupt the handwritten user input by taking an input break. For example, they can pause or stop while writing a word. While driving a motor vehicle, this may be necessary in order to carry out a driving maneuver, for example. There is then an incomplete handwritten user input in which there is an incompletely written word, for example "Berl" for the word "Berlin." The problem that can arise here is that an aural or phonetic transcription is always required for the voice message of a word, which specifies which sound sequences are to be output by the voice message in order to reproduce the relevant word aurally or linguistically. Transcription of this kind can be based on a phonetic alphabet or a phonetic transcription. One example is the International Phonetic Alphabet (IPA). For complete words, for example in the case of place names, a database of a navigation system can be used, from which the transcription for street names and/or place names can be taken. In the above example, a phonetic transcription for the whole word "Berlin" is available. The recognized, handwritten word is searched for in such a database and the transcription for the word is then read out from the database. However, if there is only a partially written word, i.e., a partial word, the database search will not be successful, as there is no database entry for this partial word. A partial address therefore cannot be resolved because the whole word as entered in the database is missing. The same can also happen for an address entry made up of several words (e.g. "Champs Elysees") if the handwritten user entry initially only specifies one of the words. This can lead to an ambiguous search result in the database.

In addition, searching such a database is very computationally intensive, which is why a repeated search for each partial entry or each entered partial word (for example, after each newly entered letter) would cause a computing load in the navigation database that is undesirable.

DE 10 2012 217 160 A1 describes a speech synthesis system which is designed to determine suitable sounds during speech synthesis. The output quality can be iteratively improved. In this case, in a synthesis machine, speech units of spoken language that have already been recorded are drawn upon. In order to correctly pronounce the partial word or to even make it possible to find, a corresponding number of voice recordings would have to be available, in the example, not only of "Berlin" but also of "Berl." This would require a lot of data storage.

An audio reproduction of written documents is known from DE 600 12 655 T2. This audio playback also uses ready-made audio snippets to generate the speech and generates new audio snippets if no suitable audio snippet is found. For this purpose, a word to be pronounced is broken down into components of its phonemes and the most likely pronunciation is then determined on the basis of a probability analysis. This can result in an error.

A method for outputting information from vehicle operating instructions is known from DE 10 2012 006 714 A1. The instruction manual can be converted into speech in order to operate a text-to-speech facility. However, only a completely written operating manual can be output as a voice message in this case.

A method for entering characters into a data-processing system is known from DE 10 2005 021 526 A1. Using a sensor apparatus a plurality of handwriting elements are detected one after the other, each of which represents a sentence consisting of at least one character. Using a recognition apparatus, the respective sets of characters are determined from the detected handwriting elements in order to use the determined sets of characters to form a character sequence in the sequence in which the handwriting elements assigned to the sentences were detected. An acoustic output apparatus outputs the determined sets of characters in the order in which the handwriting elements assigned to the sentences were detected.

A method for providing clues for handwriting recognition is known from US 2006/0210173 A1. The clues can be associated with a database of known values or expected character types. They minimize the list of possible text values of fields that recognition devices use to recognize handwriting, such that fewer opportunities have to be checked for a match and the probability of accurate recognition increases.

BRIEF DESCRIPTION OF THE DRAWINGS/FIGURES

FIG. 1 shows a plan view of a schematic trajectory of a vehicle, in accordance with some embodiments.

DETAILED DESCRIPTION

The problem addressed by the present disclosure is to make it possible to generate a voice message as feedback even if the handwritten user input by a user to be output only contains a partial word, i.e., not a fully written word or a whole word.

The problem is solved by the subject matter of the independent claims. Advantageous embodiments are described by the dependent claims, the following description, and the drawings.

In some embodiments, a method for generating a voice message as feedback to a handwritten user input is disclosed. The user enters the user input on a control device. In the manner described, the problem can now arise that the user input does not indicate a whole word, but only a partial word, because the user is taking a break in input, for example, i.e., interrupting their handwritten user input. Nevertheless, a voice message should be possible for the partial word entered up to then. For this purpose, according to the method, a list of possible whole words that can be entered by the user input, i.e., complete words, is provided together with the relevant aural or phonetic transcription. The transcription describes what sound sequence is to be generated in the voice message in order to reproduce the whole word verbally or acoustically. In the case of one or some or each of the whole words that can be entered, a predetermined word end is then removed from its end once or repeatedly in accordance with a predetermined abbreviation rule. The word end can thus comprise a letter or a sequence of letters. The word end is thus cut off or removed from the whole word from the back or from the end. The word end comprises one or more characters of the whole word, such that the whole word is shortened by the word end. This creates a new partial word, namely the whole word shortened by the word end. The question is then how to pronounce this abbreviated whole word, i.e., the now incomplete whole word. Accordingly, a transcription end corresponding to the removed word end is determined corresponding to the relevant abbreviated whole word by means of a predetermined assignment rule and is removed from the corresponding transcription of the whole word, which means that, each time, not only a partial word (i.e., a whole word from which a relevant word end has been removed once or multiple times) but also an associated partial transcription (complete transcription from which the transcription end corresponding to the removed word end has been removed once or multiple times) are therefore generated. The partial word thus generated and the associated partial transcription are added to said list. The list is therefore automatically supplemented with partial words (incomplete words) and an associated transcription.

Therefore, according to the method described herein in accordance with some embodiments, a voice message can also be generated as feedback to a handwritten user input which only comprises a partially written whole word, i.e., a partial word. A corresponding partial transcription is then available in the list. In addition, the search for the partial word in the list is successful since there is an explicit or separate entry for the partial word in the list.

Accordingly, a voice message is provided as feedback even for an incomplete handwritten user input, i.e., only partially written whole word.

In some embodiments, while the user has only partially entered one of the whole words by means of the user input such that one of the partial words is entered, the associated partial transcription is sought from the list depending on the entered partial word and the voice message for the partial word is generated on the basis of the partial transcription. The partial word and its partial transcription therefore do not need to have been explicitly entered in the list for the voice message, for example, by an operator, but instead a list of the whole words and their transcription is sufficient here. The method automatically supplements the list with the partial words and their correct partial transcription in the manner described, and this partial transcription is then used for the voice message.

In some embodiments, a letter-by-letter abbreviation of the relevant word is brought about by means of the abbreviation rule. Therefore, there are as many partial words as the whole word has letters, which then corresponds to all the possibilities that a user can possibly generate when entering a partial word by hand. A voice message is thus made possible for each state of the handwritten user input during a whole word.

In some embodiments, a corresponding transcription character or a corresponding transcription character sequence is assigned by means of said assignment rule (finding the corresponding transcription end at a word end) for some or all characters from which the possible whole words are formed. This is necessary because each individual letter does not have to correspond exactly to a single transcription character. For each letter removed at the end of the whole word, which can be removed once or multiple times), the associated transcription character or a corresponding transcription character sequence is assigned and this is then removed from the corresponding transcription as the transcription end. This has the advantage that a correct partial transcription is achieved even if the associated transcription provides several transcription characters for a single letter of the whole word. This may be the case for the letter "b," for example, which can be represented in a transcription by the transcription character "2b." In addition, it can also be recognized on the basis of a context whether a transcription character is to be removed at all, such that in this embodiment it can be provided that no transcription character is assigned by means of the assignment rule. For example, the letter sequence "tt" is represented by the transcription character sequence ".t." If a "t" is then removed by abbreviating by a letter so that "t" remains, the transcription character sequence ".t" must not be removed as well since it still represents the remaining character "t." The assignment rule can thus advantageously represent or take into account linguistic characteristics.

In some embodiments, said list is provided as an independent look-up table (LUT) in a memory of the control device. Accordingly, a search for partial words and their partial transcriptions can be carried out independently of a database in which the originally provided list is stored. This prevents a strain from being placed on the database during operation of the control device. A look-up table for a list, which provides an assignment of whole words and partial words to a corresponding transcription and partial transcription, can be implemented with a smaller data volume than the navigation database 24 from which the original list was taken, such that a correspondingly fast and/or low-resource search is possible.

In some embodiments, the list of possible whole words is extracted from a navigation database. In this way, a voice message can be produced for database entries in a navigation database. In this case, the method is then used to automate the completion of the possible partial words that may arise from a handwritten user input due to an input interruption or an input pause.

The use of the method according to various embodiments described herein in a control device in a motor vehicle is particularly advantageous. In accordance with some embodiments, the control device disclosed herein is operated in a motor vehicle. A handwritten user input can lead to an input pause here because a user of the motor vehicle has to concentrate on road traffic, for example, and therefore pauses input.

In some embodiments, a control device includes an input apparatus for receiving handwritten user input, an output apparatus for outputting a voice message, and a processor apparatus. The handwritten user input can be received by the input apparatus, for example, via a touchpad or a touchscreen. An output apparatus for outputting the voice message can for example be based on a TTS system known per se from the prior art. The processor apparatus is configured to implement an embodiment of the method according to the invention. For this purpose, the processor apparatus may comprise at least one microcontroller and/or at least one microprocessor. The processor apparatus may have a program code, which contains program instructions which are configured to implement the embodiment of the method according to the invention when executed by the processor apparatus. The program code may be stored in a data memory of the processor apparatus.

In some embodiments, the control apparatus is configured to recognize an input pause during the user input. This can be implemented, for example, by it being recognized that a change in the user input, i.e., a change in a line drawn by the user, for example, remains unchanged for a predetermined minimum duration (for example in a range of from 0.5 seconds to 5 seconds) and/or a force acting on the input apparatus becomes less than a predetermined threshold value. Furthermore, the control device is configured to output a partial word that has been received via the input apparatus up to that point as a voice message by means of the output apparatus when an input pause is recognized. The partial transcription of the partial word required for this can be provided in the manner described in the list supplemented with the partial words and their partial transcription.

In some embodiments, a motor vehicle, which comprises an embodiment of the control device according to some embodiments as disclosed herein is described. The motor vehicle may be designed as a car, in particular as a passenger car or truck. In the manner described, there is a high probability of an input pause in a handwritten user input, particularly in a motor vehicle. The implementation of the method as described herein in accordance with some embodiments is therefore particularly advantageous here.

The features of the described embodiments may also be combined.

The embodiments explained below are preferred embodiments of the disclosure and described using FIG. 1. In the embodiments, the described components of the embodiments each represent individual features, which are to be considered to be independent of one another and in other combinations of the features. In addition, the embodiments described may also be supplemented with further features already been described in the present disclosure.

In the FIGURE, the same reference signs designate elements that have the same function.

FIG. 1 schematically shows a motor vehicle 10, which may for example be a motor vehicle, in particular a passenger car or truck. Instead of the motor vehicle 10, however, another device, for example a smartphone or a tablet PC, can also be provided. In the following, a motor vehicle is taken as a starting point merely for the sake of clarity.

An input apparatus 11 for entering or receiving a handwritten user input 12 can be provided in the motor vehicle 10. A handwriting-recognition apparatus 13 (HWR) can recognize an entered word 14 on the basis of the user input 12. The word 14 can be a whole word or, as shown in the FIGURE, an entered partial word 15. The partial word "Berl" shown as an example may be the start of the whole word "Berlin." In general, a whole word is a complete word, and a partial word is an incomplete word. It may be provided that when an input pause is recognized, if the user interrupts their user input on the input apparatus 11, e.g. for a predetermined minimum duration, the already entered partial word 15 is still output to the user by means of an output apparatus 16 as a voice message 17, e.g. by means of a speaker apparatus 18 of the output apparatus 16, such that they can hear what they have written so far or what has been recognized so far. The conversion into the voice message 17 can take place in a manner known per se by means of a voice synthesis system 19 (TTS system).

The speech synthesis system 19, however, requires a phonetic transcription 20, which describes the sound sequence which the recognized word 14 represents, in order to generate the voice message 17. In the case of a partial word 15, a transcription 20 is necessary, which is referred to here as a partial transcription 21 because it relates to the transcription of a partial word, i.e., an incomplete word. The speech synthesis system 19 can additionally or alternatively be configured to determine the transcriptions of the whole words 23 itself. This is known, for example, when the aim is to output messages (news) or SMS messages (SMS—short message service) via voice output. A disadvantage, however, is that this internal generation of the transcription is generally worse/less precise than if an existing transcription from outside (navigation database) is used. Therefore, the method also serves the purpose of having the TTS produce the best possible quality.

In order to obtain this partial transcription, the following is provided:

A list 22 of the whole words 23 that can be entered by the user can be taken from a navigation database 24 (NavDB), for example. An associated transcription 25, i.e., a whole-word transcription, can also be taken from this navigation database 24 for each whole word 23, such that the list 22 includes a transcription 25 for each whole word 23. The list 22 can contain more than the three whole words shown, as is symbolized by ellipses 26 (" . . . ").

The following can then be provided for each or some or one whole word 23. This is illustrated in the FIGURE using the example of the whole word "Berlin." A predetermined word end 28 can be removed in succession from a word end 27 of the whole word 23. The sequence of word ends 28 may correspond, for example, to abbreviating the whole word 23 letter by letter. The transcription 25 belonging or assigned to the whole word 23 then also has to be abbreviated. However, an individual transcription character of the transcription 25 does not correspond to every letter of the whole word 23. An assignment rule 29 can therefore be provided which assigns a corresponding transcription character or a corresponding transcription character sequence S (for example "i:") to each letter or generally to each possible word end C.

From the transcription 25 of the whole word 23, a corresponding transcription end 31' can then be formed from the assignment rule 29 in accordance with the removed word end 28 and can be removed from the transcription 25. This results in an associated partial transcription 25' for the remaining partial word 28'. When removing word ends 28, with each step of removing the whole word 23 can be taken as a starting point again and this can be shortened by an increasingly long word end (as shown in the FIGURE), or the preceding step can be taken as a starting point with each step of removal from the partial word 28'. Both approaches are equivalent.

This can be stored together with the possible whole words 23 in an extended list 30, which can be designed as a look-up table (LUT) and can be stored in a memory 31 of the control device B.

A control device B can be provided in the motor vehicle 10, by means of which a user can carry out a handwritten user input 12, for example for entering a navigation destination in a navigation system or a navigation assistance system.

If the user input 12 is then received and the recognized word 14 is present, a check can be made for the voice message 17 in the expanded list 30 as to whether the recognized partial word 15 is contained therein. If the search result 32 is negative, the partial word 15 can be output as a spelling 33 by means of the speech synthesis of the speech synthesis system 19. If the search result 32' is successful, i.e., if the partial word 15 is recognized in the list 30, the associated partial transcription 21 can be read out from the list 30 and made available to the speech synthesis system 19. This can then generate the voice message 17 on the basis of the partial transcription 21. The user therefore hears the partial word 15 that has been written or entered so far when they pause in their input.

A particularly preferred embodiment in connection with a motor vehicle 10 and a navigation database 24 is described below.

The TTS system (speech synthesis system 19) is therefore linked to a look-up table LUT, which contains all possible orthographic variants of street and place names as a key, and the corresponding transcriptions of these variations, i.e., the partial transcriptions 21, as values.

The (whole-word) orthographies and transcriptions are extracted in advance from the navigation database 24 and stored in the look-up table LUT. This LUT can then be coupled to the TTS system during runtime. Moving the data relevant for the TTS (words and transcriptions) from the navigation database 24 to a separate TTS resource (list 30) eliminates the problem of access time.

However, a direct transfer of the information from the navigation database 24 would not solve the problem of pronunciations in the event of incomplete address entries such as "Frankfu" (for Frankfurt) or "chaus" (for Chaussee).

Therefore, the orthographies and transcriptions from the navigation database 24 are further processed.

Using a heuristic algorithm (assignment rule 29), it is possible to break down the orthographies synchronously with the associated transcriptions into individual parts or partial words 28'. This can be done on a syllable basis or on a character basis, for example.

This breakdown of the orthographies and transcriptions lastly takes place for all entries in the navigation database 24. The results are recorded in the LUT, i.e., the supplemented list 30, and are then available for high-performance retrieval by the TTS system.

By means of this method, correct acoustic confirmation can be achieved for each partial-word input by a user in the area of address input, e.g. by means of a touchscreen. Owing to the close connection of the LUT, the underlying data is available for use almost without delay. In particular, incomplete entries can be handled reliably using the method, since a phonetic transcription is stored in the LUT for all variants.

The breakdown takes place on the basis of the heuristic algorithm, as is implemented by the assignment rule 29, and can take various forms. Useful options are, for example, breakdown on a syllable basis or on a character basis as an abbreviation rule.

Using the example of the whole word "Westerbüttel," the abbreviation using the "letter-by-letter" abbreviation rule may look as follows:

| Orthography | Transcription |
|---|---|
| Westerbüttel | 'vEs.t$R.'2bY.t$l |
| Westerbütte | 'vEs.t$R.'2bY.t$ |
| Westerbütt | 'vEs.t$R.'2bY.t |
| Westerbüt | 'vEs.t$R.'2bY.t |
| Westerbü | 'vEs.t$R.'2bY |
| Westerb | 'vEs.t$R.'2b |
| Wester | 'vEs.t$R |
| Weste | 'vEs.t$ |
| West | 'vEs.t |
| Wes | 'vEs |
| We | 'vE |

Only the first whole-word entry "Westerbüttel" with its transcription "'vEs.t$R.'2bY.t$1" can be extracted from the navigation database 24. All further entries are then generated by the algorithm. In the variant shown, the place "Westerbüttel" is abbreviated backwards by one character or letter each time. The same abbreviation is carried out during the transcription.

However, 1:1 abbreviation is not always possible here. For example, the transcription for "Holzchaussee" is as follows: "'hOlt&s.SO.'2se:.." The transcription of the letter "z" alone is provided here by "t&s." Similarly, in this example, the combinations "ch" <-> "S" and "au" <-> "O" would be difficult and have to be processed accordingly by the algorithm.

The application is basically applicable to all phonetic alphabets, but requires adjustments in the heuristics (assignment rule 29).

Overall, the examples show how to provide partial transcriptions to increase the quality of TTS synthesis (TTS—text-to-speech) in the field of handwriting recognition.

The invention claimed is:

1. A method for generating a voice message as feedback to a handwritten user input entered by a user on a control device, the method comprising:
   receiving, by a processor of the control device, a first list comprising a plurality of whole words together with a corresponding phonetic transcription from a database, wherein the plurality of whole words comprises a whole word received as the handwritten user input;
   removing, from the whole word, a predetermined word end according to a predetermined abbreviation rule, the predetermined word end comprising one or more characters of the whole word;

determining a transcription end corresponding to the predetermined word end from a transcription corresponding to the whole word according to a predetermined assignment rule;
generating a partial word corresponding to the whole word, and a partial transcription corresponding to the partial word by removing the transcription end from the transcription corresponding to the whole word using a program code stored in a memory of the control device;
adding the partial word and the partial transcription corresponding to the partial word to a second list, wherein the second list is stored in the memory of the control device;
receiving a partially entered word corresponding to one of the plurality of whole words from an input apparatus of the control device;
retrieving, from the second list, a partial transcription corresponding to the partially entered word;
generating the voice message based on the partial transcription corresponding to the partially entered word; and
outputting the voice message using a speaker apparatus.

2. The method of claim 1, further comprising generating the voice message with a spelling of the partially entered word if the partially entered word is not present in the second list.

3. The method of claim 1, wherein the predetermined abbreviation rule comprises a letter-by-letter abbreviation of a word of the plurality of whole words.

4. The method of claim 1, wherein a transcription character or a transcription character sequence or no transcription character is assigned corresponding to the predetermined assignment rule for some or all characters of the whole word.

5. The method of claim 1, wherein the second list is provided as an independent look-up table (LUT) in the memory of the control device.

6. The method of claim 5, wherein the control device is operated in a motor vehicle.

7. The method of claim 1, wherein the first list is extracted from a navigation database.

8. The method of claim 1, further comprising:
detecting an input pause in the handwritten user input; and
in response to the detection of the input pause, generating the voice message corresponding to the partially entered word received up to the input pause.

9. A control device, comprising:
an input apparatus configured for receiving a handwritten user input;
a processor configured to perform operations comprising:
receiving a first list comprising a plurality of whole words together with a corresponding phonetic transcription, wherein the plurality of whole words comprises a whole word received as the handwritten user input, and wherein the first list is extracted from a navigation database;
removing, from the whole word, a predetermined word end according to a predetermined abbreviation rule, the predetermined word end comprising one or more characters of the whole word;
determining a transcription end corresponding to the predetermined word end from a transcription corresponding to the whole word according to a predetermined assignment rule;
generating a partial word corresponding to the whole word, and a partial transcription corresponding to the partial word by removing the transcription end from the transcription corresponding to the whole word using a program code stored in a memory of the control device;
adding the partial word and the partial transcription corresponding to the partial word to a second list;
receiving a partially entered word corresponding to one of the plurality of whole words from the input apparatus;
retrieving, from the second list, a partial transcription corresponding to the partially entered word; and
generating a voice message based on the partial transcription corresponding to the received partially entered word; and
an output apparatus to output the voice message.

10. The control device of claim 9, wherein the processor is further configured to perform additional operations comprising:
detecting an input pause in the handwritten user input; and
in response to the detection of the input pause, generating the voice message corresponding to a partial word received up to the input pause.

11. The control device of claim 9, wherein the processor is configured to implement the abbreviation rule comprising a letter-by-letter abbreviation of a word of the plurality of words.

12. The control device of claim 9, wherein the processor is configured to assign a transcription character or a transcription character sequence or no transcription character corresponding to the predetermined assignment rule for some or all characters of the whole word.

13. The control device of claim 9, wherein the second list is provided as an independent look-up table (LUT) in the memory of the control device.

14. The control device of claim 9, wherein the control device is operated in a motor vehicle.

15. The control device of claim 9, wherein the processor is configured to extract the first list from the navigation database.

16. The control device of claim 9, wherein the processor is configured to generate the voice message with a spelling of the partially entered word if the partially entered word is not present in the second list.

17. A motor vehicle, comprising:
a control device, comprising:
an input apparatus configured for receiving a handwritten user input;
a processor configured to perform operations comprising:
receiving a first list comprising a plurality of whole words together with a corresponding phonetic transcription from a database of the motor vehicle, wherein the plurality of whole words comprises a whole word received as the handwritten user input, and wherein the first list is extracted from a navigation database;
removing, from the whole word, a predetermined word end according to a predetermined abbreviation rule, the predetermined word end comprising one or more characters of the whole word;
determining a transcription end corresponding to the predetermined word end from a transcription corresponding to the whole word according to a predetermined assignment rule;
generating a partial word corresponding to the whole word, and a partial transcription corresponding to the partial word by removing the transcription end from the transcription corresponding to the whole word using a program code stored in a memory of the control device;

adding the partial word and the partial transcription corresponding to the partial word to a second list;

receiving a partially entered word corresponding to one of the plurality of whole words from the input apparatus;

retrieving, from the second list, a partial transcription corresponding to the partially entered word; and generating a voice message based on the partial transcription corresponding to the received partially entered word; and an output apparatus configured for outputting the voice message.

18. The motor vehicle of claim 17, wherein the processor is further configured to perform additional operations comprising:

detecting an input pause in the handwritten user input; and in response to the detection of the input pause, generating the voice message corresponding to the partially entered word received up to the input pause.

* * * * *